US 6,457,905 B1

(12) United States Patent
Nickell (10) Patent No.: US 6,457,905 B1
(45) Date of Patent: Oct. 1, 2002

(54) IN-SITU DEEP REMEDIATION INJECTION SYSTEM AND METHOD

(76) Inventor: Jerry D. Nickell, 6932 Sunrise Ct., Midland, TX (US) 79707

( * ) Notice: Subject to any disclaimer, the term of this patent is extended or adjusted under 35 U.S.C. 154(b) by 0 days.

(21) Appl. No.: 09/522,953

(22) Filed: Mar. 10, 2000

(51) Int. Cl.[7] .............................. B09C 1/02; B09C 1/10
(52) U.S. Cl. ..................... 405/128.5; 111/7.4; 210/170; 210/747; 405/128.45; 405/263; 588/900
(58) Field of Search ....................... 405/128.15, 128.45, 405/128.5, 263, 264, 269; 111/7.1, 7.2, 7.3, 7.4, 118; 210/170, 747; 435/262.5; 588/900

(56) References Cited

PUBLICATIONS

Remediation Services Using The Geo–Cleanse International, Inc.Company Profile (undated).
Hydrogen Peroxide Treatment: The Good, the Bad, the Ugly; Treatment Technology, Summer 1999 GWMR.
Introduction to Hydrogen Peroxide, Environmental Application Overview, Jul. 6, 1999.
Soil Treatment, In–situ Chemical Oxidation of Contaminated Soils (Using Hydrogen Peroxide); Reference Library Peroxide; Reference Library Peroxide Applications, Hazardous Waste, Jul. 6, 1999.

*Primary Examiner*—George Suchfield
(74) *Attorney, Agent, or Firm*—Gardere Wynne Sewell LLP (57) ABSTRACT

An improved deep remediation injection system for in-situ remediation of contaminated soil and ground water. The system includes a soil penetrating lance for injecting at least two different highly-pressurized fluids taken from the group of air, gaseous oxygen, ozone, oxygenated liquid, hydrogen peroxide, surfactant-containing liquid, catalyst-containing liquid and suspended biologicals-containing liquids, or a liquid containing other chemicals, into said contaminated soil as said soil penetrating lance is inserted for penetration therein. The soil penetrating lance has at least an upper set of injection ports, the upper set of injection ports being generally radially spaced-apart on said lance, and at least one lower set of injection ports, the lance having an average width in the vicinity of the upper set of injection ports. The lance further includes substantially fluidically-independent first and second conduits leading, respectively, to the lower set of injection ports and the upper set of injection ports so as to permit delivery of separate pressurized fluid streams to the upper and lower sets of injection ports and then into the soil. The upper and lower sets of injection ports are spaced apart from each other on said lance a distance no farther than about three times the average width of said lance in the vicinity of the upper set of injection ports.

18 Claims, 7 Drawing Sheets

IN-SITU DEEP REMEDIATION INJECTION SYSTEM AND METHOD

FIELD OF INVENTION

This invention relates to deep remediation injection systems for in-situ remediation of contaminated soil and ground water by progressive penetration both vertically and horizontally in contaminated soil and ground water using treatment liquids under high pressure and low volume.

BACKGROUND OF THE INVENTION

The prior art's use of biologicals and other treatment materials for soil and water remediation is well-developed but the means of delivery varied widely. For example, some applications have used large boring devices to drill holes in the contaminated soil and set casing into the hole but leave the hole open at the bottom to receive the treatment biologicals for biological remediation. This type of remediation is a very expensive system and very cumbersome and required large equipment. This type of remediation system also does not provide a fine adjustment of the remediation process because it relies upon a few large holes and not many small ones to tightly control the treatment area. This use of drilled holes and set casing also required large drilling equipment to make the holes and large pipe handling equipment to set the pipe in the holes.

Also in the prior art are many other forms of remediation such as the removal of the contaminated soil to be delivered to a treatment site for incineration to burn off the contaminants and leave only clean soil after the process. This has been a very expensive process for remediation and cost is a very important factor in the remediation business. It also can have the pollution side effect of vapor and air pollution while the soil is being removed and moved to the incineration site if not controlled, but the control adds cost to the process also.

Yet other prior art has used biologicals instead of incineration of the hauled off dirt at a remote treatment site in a controlled above ground treatment of the contaminated soil. This approach has many pollution problems such as possible water pollution and air pollution, and is also very expensive. It clearly means handling the soil twice, once on removal and once on completed treatment, just as incineration does.

Most of the prior art was and is designed and used in solo applications and does not work with the other remediation techniques. For example, the removal of contaminated soils to a treatment site for bioremediation of soil would not generally work with or in conjunction with the bored hole and casing approach of bioremediation except in the case of a requirement of double treatment of the contaminated soil.

In one prior art approach to alleviating some of the above-mentioned disadvantages, U.S. Pat. No. 5,868,523, issued Feb. 9, 1999, an in-situ remediation apparatus and method is disclosed using a manually operated soil penetrating lance. The lance has two sets of injection ports spaced widely apart for delivering, respectively, compressed air through one set of ports and a pressurized liquid such as water, hydrogen peroxide, biologicals, surfactants, nutrients or other treatment chemicals for delivery through the other set of ports. Although this approach has advantages over the other prior art approaches, the disclosed soil penetrating lance and the method for using it has been found to have drawbacks. In particular, U.S. Pat. No. 5,868,523 discloses dedication of one set of ports to the compressed gas and the other set of ports to a particular pressurized liquid. In some applications of treating contaminated soils, it is desirable to use at least two different liquids containing distinct chemicals. For example, treatment of contaminated soils by means of the well-known Fenton's reaction involves use of hydrogen peroxide and a catalyst-containing liquid, which preferably are stored separately and injected into the soil separately. Because U.S. Pat. No. 5,868,523 is adapted only for injection of one liquid stream at a time, intimate mixing of the hydrogen peroxide and the catalyst-containing liquid in the soil in the optimum proportion cannot be assured.

Furthermore, in U.S. Pat. No. 5,868,523, the set of injection ports for the compressed air and the set of injection ports for the pressurized liquid are spaced relatively far from one another. The purpose of spacing the sets of ports relatively far apart is to reduce pressure of the liquid before it comes in contact with the gas ports, to minimize the likelihood of clogging. However, spacing the sets of ports far apart also diminishes the intimacy of the mixing of the gas and/or liquids discharged into the soil from the respective sets of ports.

In U.S. Pat. No. 5,868,523, the lance is built in sections which are connected together using a threaded adaptor nozzle which seals by means of insertion of a male beveled sealing end of a tubular member into a mating female beveled sealing face of the adaptor nozzle. It has been found, however, that this beveled sealing face arrangement may permit leakage between the air conduit and the liquid conduit.

In actual use of the method of U.S. Pat. No. 5,868,523, pressures as high as approximately 3200 psi have been employed. It has been recently discovered, however, that better results are obtained with substantially higher pressures, 3200 to 6000 psi, preferably in the range of 4000 to 6000 psi.

OBJECTS OF THE INVENTION

It is the object of this invention to provide an improved in-situ soil and ground water deep injection remediation system for the remediation of contaminated soil and ground water which overcomes the foregoing disadvantages of the prior art.

Also it is an object of this invention to provide a treatment system which permits simultaneous or sequential delivery of two separate streams of different high pressure liquids.

Also it is an object of this invention to provide a treatment system which has two separate sets of discharge ports for different high pressure liquids that are spaced relatively closely to each other.

SUMMARY OF THE INVENTION

These and other objects are accomplished in accordance with a preferred embodiment of the present invention providing a deep remediation injection system for in-situ remediation of contaminated soil and ground water capable of progressive penetration both vertically and horizontally in contaminated soil which includes a soil penetrating lance for injecting at least two different highly-pressurized fluids taken from the group of air, gaseous oxygen, ozone, oxygenated liquid, hydrogen peroxide, surfactant-containing liquid, catalyst-containing liquid and suspended biologicals-containing liquids, or a liquid containing other chemicals, into contaminated soil as the soil penetrating lance is inserted for penetration therein, the soil penetrating lance having at least an upper set of injection ports, the upper set of injection ports being generally radially spaced-apart on the lance, and at least one lower set of injection ports, the lance having an average width in the vicinity of upper set of injection ports, the lance including substantially fluidically-independent first and second conduits leading, respectively, to the lower set of injection ports and the upper set of injection ports so as to permit delivery of separate pressurized fluid streams to the upper and lower sets of injection ports and then into the soil, the upper and lower sets of injection ports being spaced apart from each other on the lance a distance no farther than about three times the average width of the lance in the vicinity of the upper set of injection ports.

In accordance with a preferred aspect of this invention, the deep remediation system has the upper and lower sets of injection ports spaced apart from each other a distance no farther than about two times the average width of the lance in the vicinity of the upper set of injection ports.

In accordance with another preferred aspect of the present invention, the radial ports of the lower set of ports of the lance are recessed into a first circumferential groove.

In accordance with another preferred aspect of the invention, the lance further includes a circumferential groove disposed between the radial ports and the axial port of the lower set of ports.

In accordance with another preferred aspect of the invention, the deep remediation system further includes a first selector valve for selectively fluidically connecting the first conduit of the lance to a selected one of at least two fluid sources.

In accordance with another preferred aspect of the invention, the deep remediation system further includes a second selector valve for selectively fluidically connecting the second conduit of the lance to a selected one of at least two fluid sources.

In accordance with another preferred aspect of the invention, the deep remediation system further includes a first selector valve for selectively fluidically connecting the first conduit of the lance to a selected one of at least two fluid sources and a second selector valve for selectively fluidically connecting the second conduit of the lance to a selected one of at least two fluid sources.

In accordance with another preferred aspect of the invention, the lance includes a shaft portion and a fluid injection portion, the fluid injection portion including an upper and lower set of injection ports, the first conduit being co-axial inside the second conduit in at least the shaft portion of the lance.

In accordance with another preferred aspect of the invention, the shaft portion and the fluid injection portion of the lance are removably joinable together, the first conduit being fluidically connectable to the lower set of injection ports and fluidically sealable from the upper set of injection ports by means of a plurality of co-axial O-ring seals.

In accordance with another preferred aspect of the invention, the deep remediation injection system further comprises an adapter tube between the shaft portion and the fluid injection portion, the adapter tube having an upper end including a plurality of co-axial O-rings and being adapted for co-axial insertion into the first conduit in the shaft, and a lower end including a plurality of co-axial O-rings and being adapted for co-axial insertion into a conduit in the fluid injection portion, thereby permitting flow of fluid from the first conduit to the lower set of injection ports and sealable separation of the fluid from fluid in the second conduit leading to the upper set of injection ports.

In another preferred embodiment of the present invention, a method of in-situ deep remediation of contaminated soil and ground water is provided using an injection lance capable of progressive penetration both vertically and horizontally in contaminated soil having an upper set of injection ports and a lower set of injection ports, comprising the steps of connecting a source of highly-pressurized gas to one of the upper and lower sets of injection ports, connecting a source of first highly-pressurized liquid selected from the group consisting of a liquid taken from the group consisting of hydrogen peroxide, liquid containing dissolved ozone, liquid containing dissolved oxygen, liquid-containing suspended biologicals or liquid containing catalysts, liquid containing a surfactant or other chemical, to the other of the upper and lower sets of injection ports, penetrating the lance into the soil to inject the gas and liquid into it through the upper and lower sets of injection ports, disconnecting the source of gas and connecting in its place a source of a second highly-pressurized liquid selected from the group consisting of a liquid taken from the group consisting of hydrogen peroxide, liquid containing dissolved ozone, liquid containing dissolved oxygen, liquid containing suspended biologicals or liquid containing a catalyst, the second highly-pressurized liquid being different from the first highly-pressurized liquid.

These and other and further features and advantages of the present invention, partly schematic, will be apparent to those skilled in the art upon review of the following descriptions and drawings, in which:

DETAILED DESCRIPTION OF EMBODIMENTS

Figure 1:
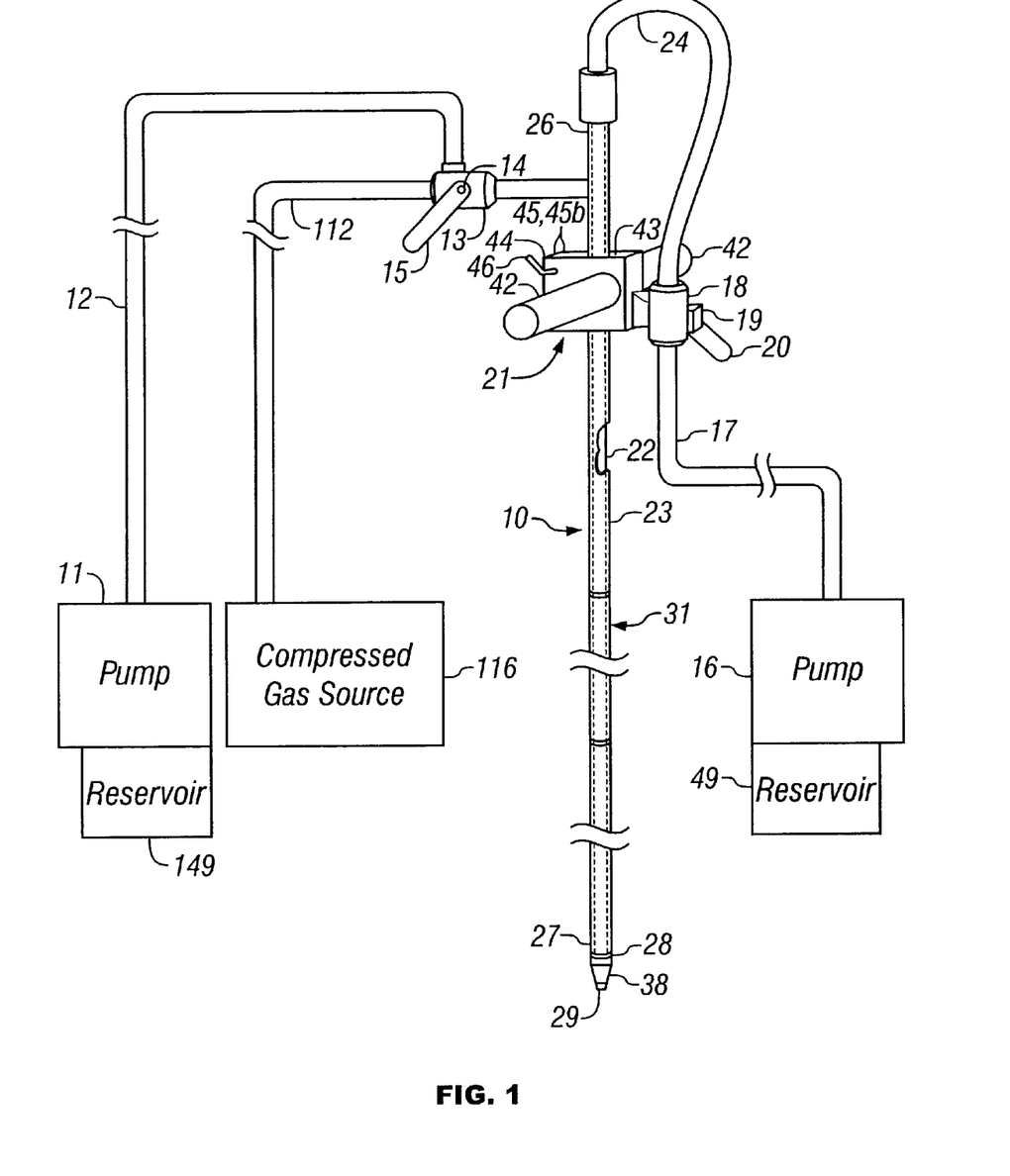
FIG. 1 is a perspective view of the lance of this invention, partly schematic, which shows the first tubular member in hidden lines, second tubular member, handle, first and second connector valves, the pumps and respective reservoirs.

Referring now to FIG. 1, the general reference 10 shows the soil penetrating lance of this invention connected in fluid communication to a liquid pump 11 for pumping a first liquid from reservoir 149 to one end 26 of the soil penetrating lance 10. The connection is through tube 12 to a three-way connector valve 13, which has a selector valve handle 14. The selector valve handle 14 is operable to allow the operator to selectably open and close the flow of the pressurized liquid from the pump 11 to the soil penetrating lance 10 or, alternatively, to selectively open and close the flow of a compressed gas such as air, ozone, nitrogen or oxygen from source 116 through tube 112. Connection valve 13 is constructed so as to permit selection of one of the fluid streams through either tube 12 or 112, but not both at the same time. The first liquid preferably includes a treatment substance such as dissolved oxygen or ozone, hydrogen peroxide, surfactant, a catalyst such as iron sulfate or potassium permanganate, suspended biologicals or other chemicals used in remediation.

Also the soil penetrating lance 10 of this invention is connected in fluid communication to another liquid pump 16 with a liquid reservoir 49 including a second liquid at one end 26 of the soil penetrating lance 10. The connection is through a liquid connector tube 17 to a liquid connection valve 18, which has a valve 19. The valve 19 is operable by a handle 20 to allow the operator to open and close the flow of the pressurized liquid from the liquid pump 16 to the soil penetrating lance 10. The liquid connection valve 18 and valve 19 are connected to the lance handle 21 as a convenience to the operator, so that the operators hands do not have to move much distance to open or close the liquid control valve 19 with the handle 20. The second liquid is preferably also a liquid including a treatment substance such as dissolved oxygen or ozone, hydrogen peroxide, surfactant, a catalyst such as iron sulfate or potassium permanganate, suspended biologicals or other chemicals used in remediation, however, the second liquid is preferably different from the first liquid.

Figure 2:
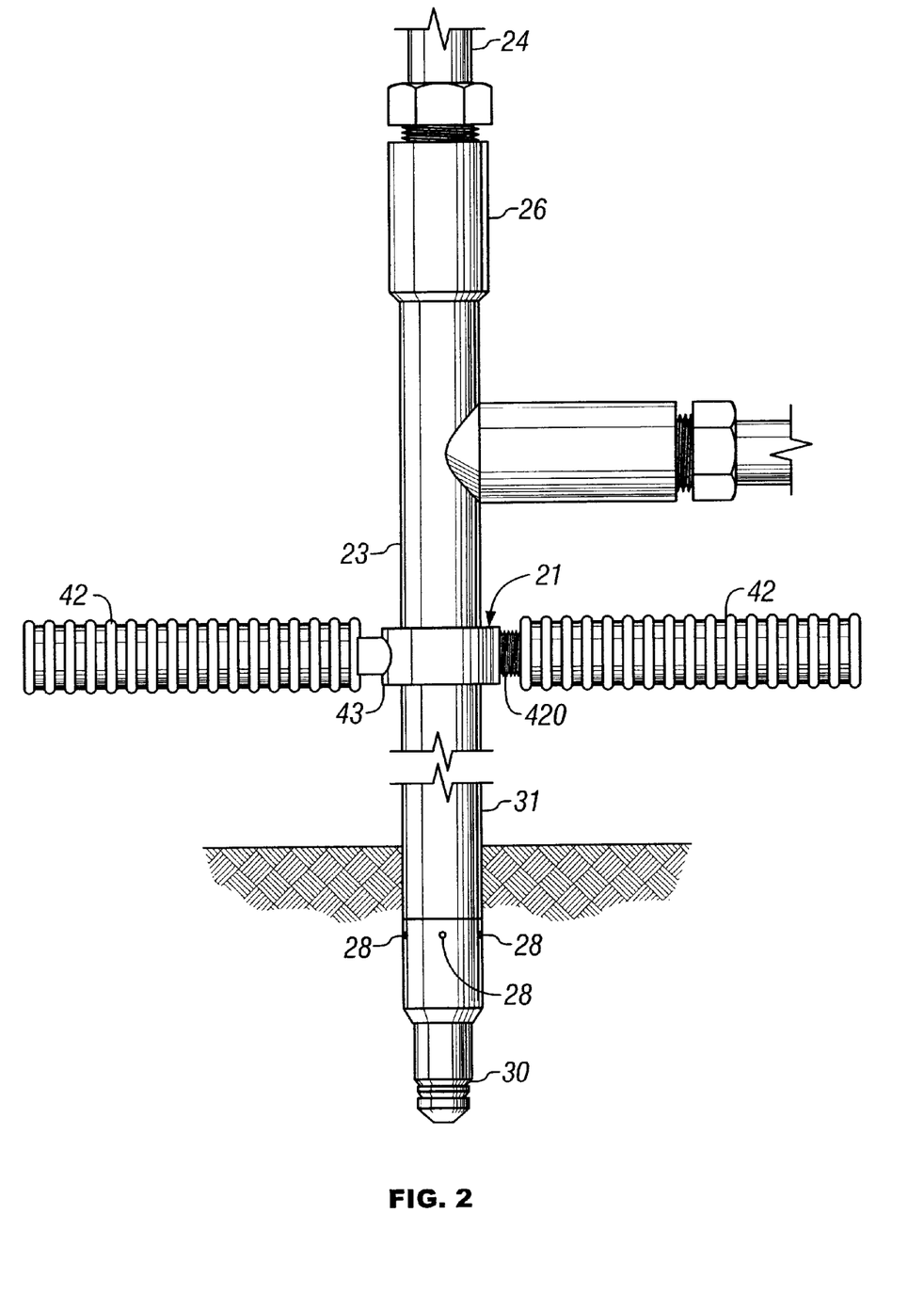
FIG. 2 is detailed side view of the lance.
Figure 13:
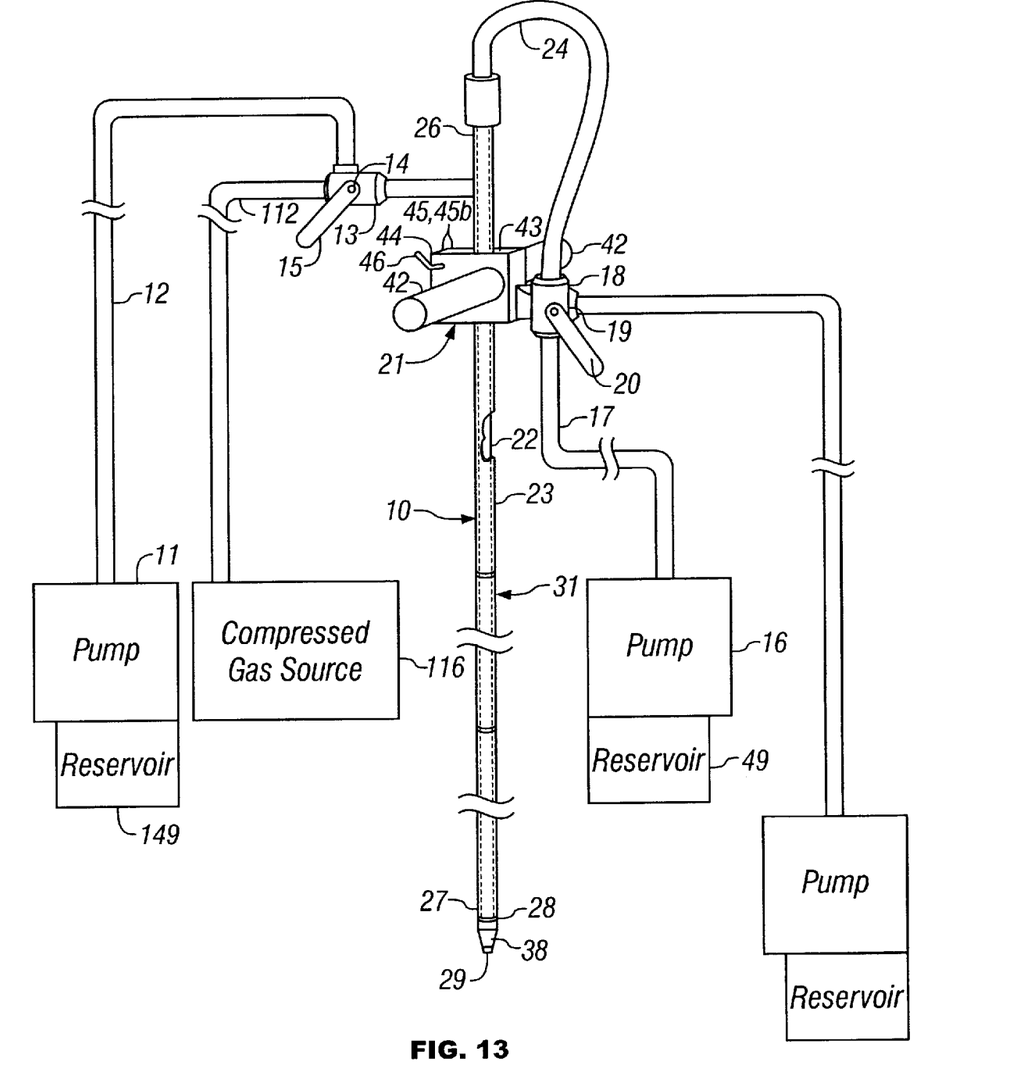
FIG. 13 is another embodiment of the deep remediation injection system of the subject invention wherein the second selector valve fluidically is connected to at least one of two fluid sources.

As shown in FIGS. 1 and 2, the body of the soil penetrating lance 10 is composed of a first tubular member 22 and a second tubular member 23. The first tubular member 22 is connected to a fluid tube 24 in connection with liquid connection valve 18 for the delivery of the pressurized fluids therethrough and for feeding into the first tubular member 22 for discharge 20 under pressure into the contaminated soil. The second tubular member 23 is connected to connection valve 13. It can also be seen in FIG. 1 that the first tubular member 22 is located inside the second tubular member 23 but also has a diameter sufficient to receive the first tubular member 22 and still allow sufficient pressurized liquid flow therethrough for injecting fluid into the contaminated soil. As shown in FIG. 13, valve 18 may be connected to at least two fluid sources. In this embodiment, at least two fluid sources are selectively fluidically connected to the fluid tube 24 of the lance 10 through the valve 18.

A nozzle member 25, as best shown in FIGS. 6–9, is connected to the other end 27 of the soil penetrating lance 10 in fluid communication with the first tubular member 22 and the liquid connection valve 18 for directional delivery of the pressurized liquids into the contaminated soil as the soil is penetrated by the soil penetrating lance 10.

Figure 6:
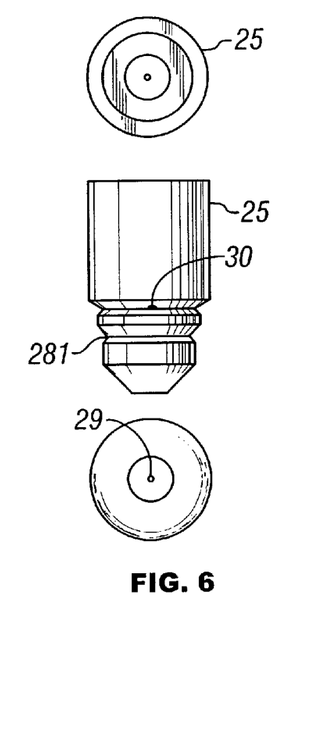
FIG. 6 is a group of views of the nozzle member, the upper view being of the top end, the lower view being of the bottom end, and the middle view being a side view.
Figure 7:
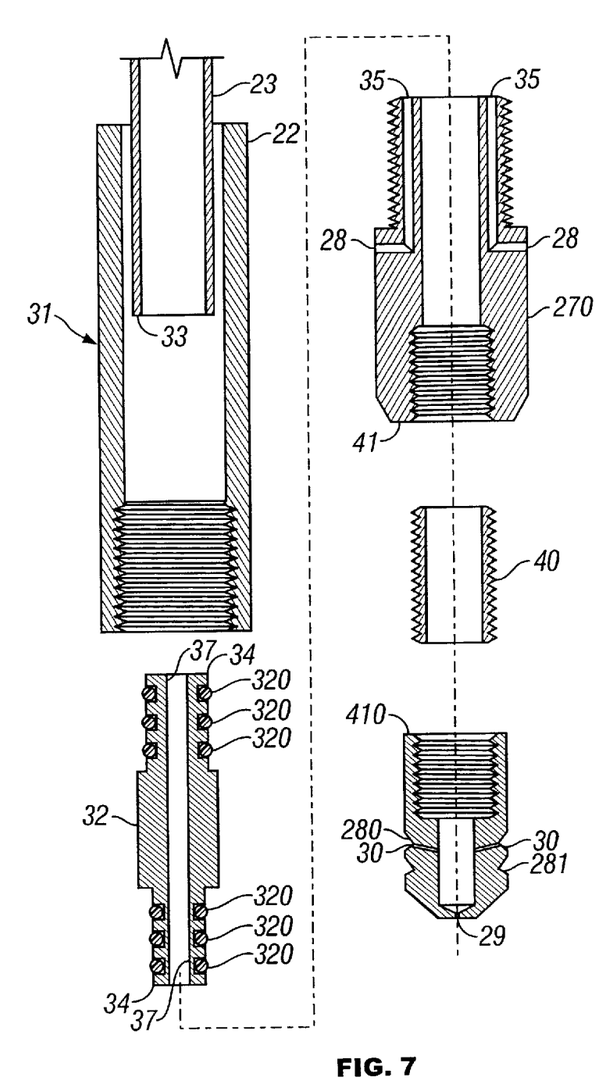
FIG. 7 is an exploded cross-sectional view of the shaft and nozzle portions of the lance.
Figure 8:
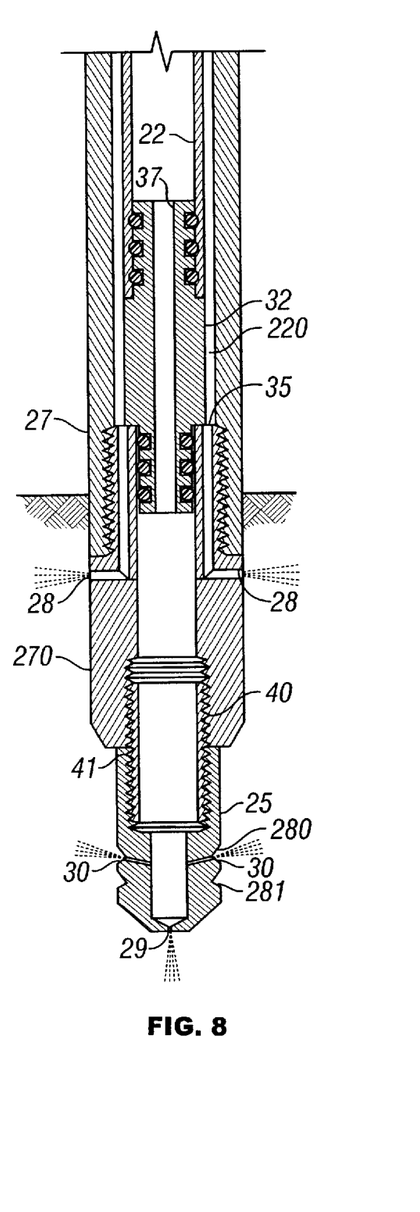
FIG. 8 is a cross-sectional view of the lance of FIG. 7, assembled.

The directional delivery of the pressurized liquids is achieved at least in this embodiment by the nozzle member 25, as best shown in FIGS. 6–9, having a forward or axial nozzle port 29 for delivery of the highly pressured liquid in very low volumes. The directional delivery of the pressurized liquid is further achieved, as shown in FIGS. 6–8, by the nozzle member 25 having at least three, and preferably four, side ports 30, which in this embodiment are tilted back away from the forward axial nozzle port 29 at least 15 degrees and are positioned away from the forward axial nozzle port 29. It should be understood by those skilled in the art that this angle may vary depending on the particular application, but it has been found that the optimum is from about 10 degrees to 20 degrees.

A particularly advantageous use of the present invention is in remediation using the well-known Fenton's reaction for oxidizing hydrocarbons using hydrogen peroxide. A preferred Fenton's reaction is:

$$H_2O_2 + Fe^{+2} \rightarrow OH^* + OH^- + Fe^{+3}.$$

The hydroxyl free radical (OH*) is powerful oxidizer of organic compounds. Any residual hydrogen peroxide is unstable and will decompose to water and oxygen in the soil, the free oxygen being available to biological agents (such as aerobic bacteria).

Because the remediation system and lance of the present invention can inject two liquid streams simultaneously and in close proximity to one another, such as when one is hydrogen peroxide and one is an aqueous liquid including a catalyst (such as iron sulfate), the two liquids can readily intimately mix in the soil in the correct proportions, facilitating the desirable Fenton's reaction. Of course, many other combinations of liquids including a variety of dissolved gases, chemicals and/or biologicals can also be employed. If air or other gas is also injected into the soil, it helps to cause microfractures, facilitating dispersion of the liquids and, if air or other oxygen-containing gas is used, can also supply oxygen for biological agents.

It will be appreciated by those skilled in the art that this high pressure and low volume is achieved by sizing the axial nozzle port 29 and side ports 30 to the pressure being supplied by the liquid pump 16 to achieve this effect. It has been found that very high pressures, i.e., 3200 psi and above, are best, the range of 4000 to 6000 psi being preferred. A pressure of approximately 5000 psi is most preferred. If pressurized gas is used, the pressures of the gas are similar. The purpose of the high pressure is to obtain some drilling power to assist the penetration of the soil penetrating lance 10 as well as to inject the gas, water, hydrogen peroxide, biologicals, surfactants, nutrients or other chemicals into as wide a treatment pattern as can be achieved around the soil penetrating lance 10.

As shown in FIGS. 1–2, 4 and 7–8, multiple ports 28 may be provided. In this embodiment, there are preferably four ports 28. It will be understood by those skilled in the art that more ports may be used, but it would be by designers choice for the particular application being designed. These ports 28 are connected in fluid communication with the connection valve 13 for delivery of the gas or liquid to the contaminated soil.

The width of the lance 10 in the vicinity of ports 28 is in the range of about ⅜ inch to about 1 inch, about ½ inch being preferred. It should be understood that the ports 28 are located nearby (about three times the width of the lance in the vicinity of the ports 28, or less) to the nozzle's side ports 30 to facilitate intimate mixing of the first and second liquids after injection into the soil. The potential for clogging ports 28 is minimized by the ports 30 being slightly recessed in groove 280. Furthermore, groove 280 tends to improve the uniformity of the radial dispersion of the fluid injection from ports 30.

It will be appreciated that the soil penetrating lance 10 can be made in various lengths to penetrate to various depths for the in-situ remediation, but it has been found that it is more practical to have the soil penetrating lance 10 in selected sizes from 6 to 12 feet in certain embodiments and then provide extension pieces to extend the operating range of the soil penetrating lance 10.

In one embodiment as shown in FIGS. 1–8, an extension member 31 is shown added to either the other end 27 of the soil penetrating lance 10 or to another extension member 31. Because the connections would be the same as those shown in the above figures whether the connection is to an extension member 31 or the other end 27 of the soil penetrating lance 10, the discussion about their fimctions of connection will be the same.

Figure 3:
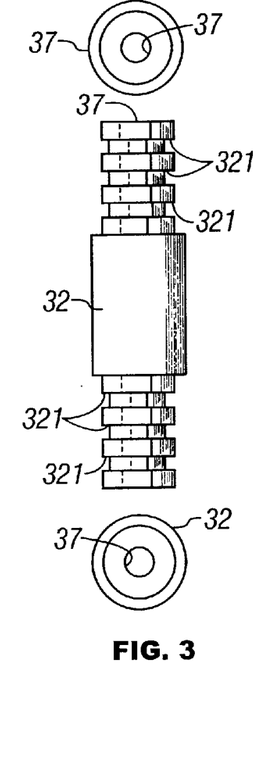
FIG. 3 is a side view showing the adapter tube.

As will be seen, the extension member 31 is formed from first and second tubular member 22 and 23, respectively. As shown in FIGS. 3, 7, and 8, an adapter tube member 32 has an end 34 for insertion into tubular member 23. In FIG. 8 it can be seen how the pieces come together. The adapter tube member 32 provides a fluid communication between the sections of the extension member 31 for the flow of the liquid from tubular member 22 to ports 28. This is achieved by the outer diameter of adapter tube member 32 being smaller than the inner diameter of tubular member 22, thus creating an annulus 220 for the passage of fluid to axial ports 35 in radial port member 270, which lead to ports 28. The adapter tube member 32 also provides a liquid flow way 37 for liquid flow through the center of adapter tube member 32. The sealing between each end of adapter tube member 32 and the respective conduit is provided by three coaxial O-rings 320 on each end of the adapter tube member 32 so that once the pieces are connected, there is full communication of both the pressurized fluid, while maintaining fluid independence of the respective fluid streams.

Figure 4:
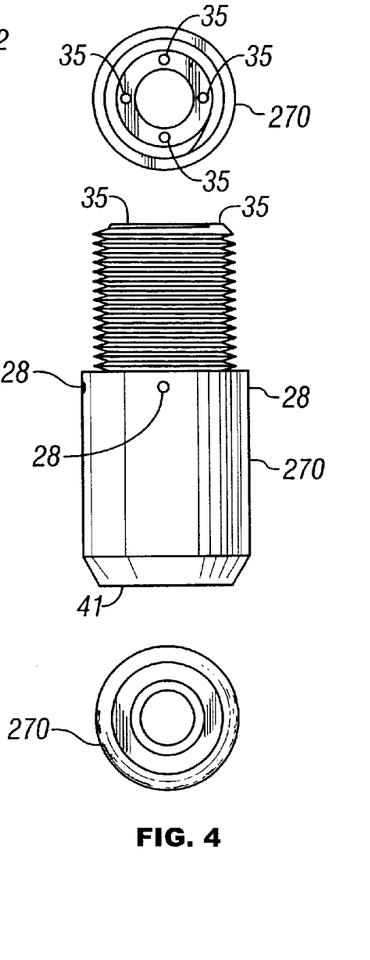
FIG. 4 is a group of views of the radial port member, the upper view being of the top end, the lower view being of the bottom end and the middle view being a side view.
Figure 5:
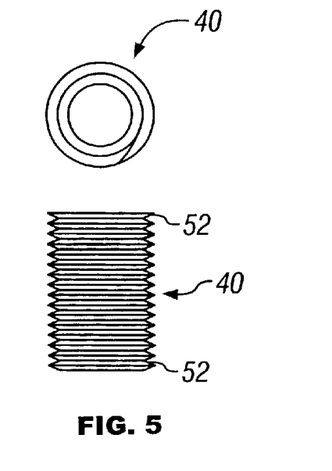
FIG. 5 is a group of two views of a threaded adapter member, the upper view being an end view and the lower view being a side view.

In FIG. 4 it will be clearly seen that the ports 35 can be numerous to enhance the free flow of the fluid.

As shown in FIGS. 4, 5, 7 and 8, an adapter member 40 is also provided for the attachment of the nozzle member 25 to either the other end 27 of the soil penetrating lance 10 or to an extension member 31, if one was being used. The adapter member 40 is hollow and threaded on both ends 52 for the joining with the nozzle member 25, which has matching threads, not shown, and to either the other end 27 of the soil penetrating lance 10 or to an extension member 31, either of which has matching threads, not shown.

The lance handle 21 can best be seen in FIG. 2. It has hand grips 42 for holding the soil penetrating lance 10 and for providing at least one surface for receiving a driving force to assist the penetration of the contaminated soil. In this embodiment there are two such hand grips 42 such that the operator may push the soil penetrating lance into the contaminated soil and control both the soil penetrating lance 10 as to direction and as to the depth of penetration.

Also associated with the lance handle 21 is a slide channel 43 which is adapted for adjustable movement up and down the length of the soil penetrating lance 10 and any extension members 31 which may be attached thereto. This lance handle 21 is further adapted for releasable affixing of the slide channel 43 up and down the length of the soil penetrating lance 10 so that when it is affixed the operator's downward force on the lance handle 21 is transferred to the soil penetrating lance 10 to drive it into the contaminated soil. It should be understood that once the soil penetrating lance 10 and lance handle 21 are driven proximate the ground, the valve 18 and the valve 13 are turned off. Then the operator would add an adapter tube member 32 and an extension member 31 to the soil penetrating lance 10 and turn the valve 18 and the valve 13 on again and continue the treatment and driving the soil penetrating lance 10 into the contaminated soil.

The releasable affixing of the slide channel 43 is achieved by one of the hand grips 42 having an end threaded into slide channel 43 so that it functions like a set screw. Those skilled in the art will realize that there may be many themes and variations of the releasable affixing of the lance handle 21 and this one disclosed is just one embodiment thereof.

From the foregoing discussion those skilled in the art will realize that this deep remediation injection system could be mounted on a small trailer and towed to the in-situ site to provide the treatment of the contaminated soil.

The deep remediation injection system for in-situ remediation of contaminated soil and ground water is most effective using the methods which will be outlined below. Clearly those skilled in the art will realize that these teachings are only suggested embodiments and that others may be used without departing from the teachings and claims herein disclosed.

The first step in the method is to evaluate the type of soil contaminants and their concentrations so that the proper biologicals and/or chemical formulations can be selected and a calculation of how many of them will be needed. After that step, the next step is evaluating the soil field capacity to determine the liquid which can be added for treatment if necessary to determine the volume of liquid which will be used at the time of injection into the contaminated soil. Under certain conditions some of the liquid will be hydrogen peroxide which serves both the liquid function, but also serves to supply as a chemical oxidizer and a rich oxygen source for biologicals. After the above two steps have been performed then there is the step of developing a treatment grid regarding the depth of treatment and as to the spacing of the penetration holes in the contaminated soil and how long a time to hold the soil penetrating lance 10 with the nozzle member 25 at each downward penetration step to achieve the desired concentration of liquid biologicals and oxygenated liquid.

In operation, pump 11 is activated to draw the first liquid from the reservoir 149 and pressurize the liquid for injection. Also at this time the activating of the pump 16 would occur to pressurize the second liquid for injection, including biologicals or other substances, through the soil penetrating lance 10.

Figures 9, 10:
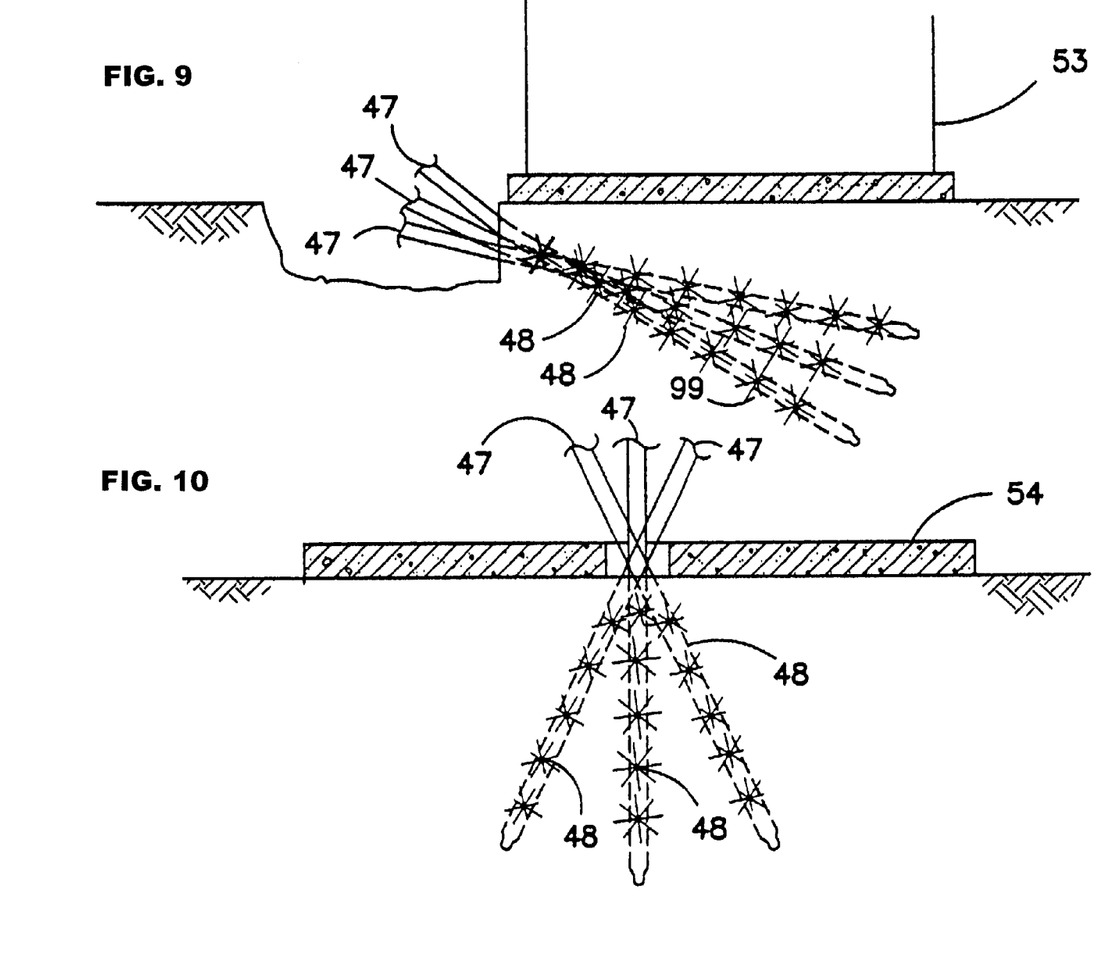
FIG. 9 is a side sectional view showing how the lance of this system is used to provide treatment under existing structures to treat contaminated soil, by using an access trench and multiple angles of penetration.
FIG. 10 is a side sectional view showing how the lance of this system is used to provide treatment through a concrete slab by using a treating hole in the concrete and using multiple angles of penetration.

Once the system is fully pressurized then the valve 18 would be opened to inject the second liquid and valve 13 would be turned on, selecting either compressed gas or the first liquid. Then, as shown in FIGS. 9 and 10, the operator would start driving the soil penetrating lance 10 into the contaminated soil, but stopping the soil penetrating lance 10 at stepped penetration points 48 for a sufficient time to treat the soil and then continuing the driving of the soil penetrating lance into the contaminated soil to the next stepped penetration point 48 until the whole in-situ remediation axial penetration line 47 is completed. The operator would then follow the plan and start another axial penetration line 47 and continue the process until the whole in-situ remediation site has been treated.

From the foregoing it will be understood by those skilled in the art that the contaminated soil is treated in-situ as a column of soil with overlap of each column to achieve complete treatment. Those skilled in the art will realize that the size of the column will change with the soil conditions. For example, if the contaminated soil is sand the column would have approximately a radial penetration of five feet from the point of injection in the soil column. In the case of contaminated clay soil the column would have approximately a radial penetration of three feet. Clearly a mixed soil of sand and clay would have some combination between the two pure soil types. Other soil types would require some trial and error by those skilled in the art to find the optimum radial penetration.

Since a column or cylinder of soil is being treated the volume of soil impacted by the deep remediation injection system and method is determined by the computation of the volume of the soil in the cylinder or the equation of volume=height of the column (pi (radius squared)). Once the total volume of soil to be treated is determined then based on the type soil and its porosity, a calculation can be made to determine the total pore volume available in the soil. Then as those skilled in the art will understand calculations can be made to determine the volume of water and suspended biological and formulations which are needed to saturate a stepped penetration point 48 and how long it will take given the flow rate of the nozzle member 25. These calculations determine how long the operator must leave the soil penetrating lance 10 at each stepped penetration point 48.

Figure 11:
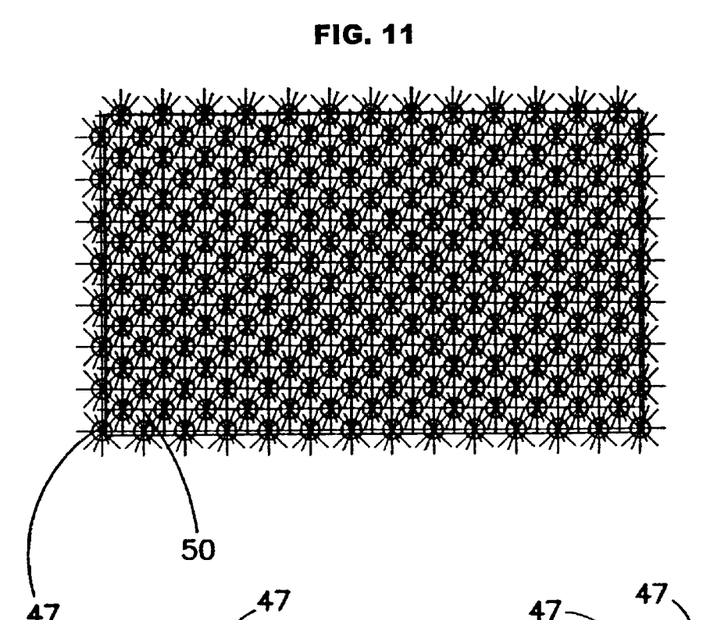
FIG. 11 shows a plan view of a typical treatment pattern.
Figure 12:
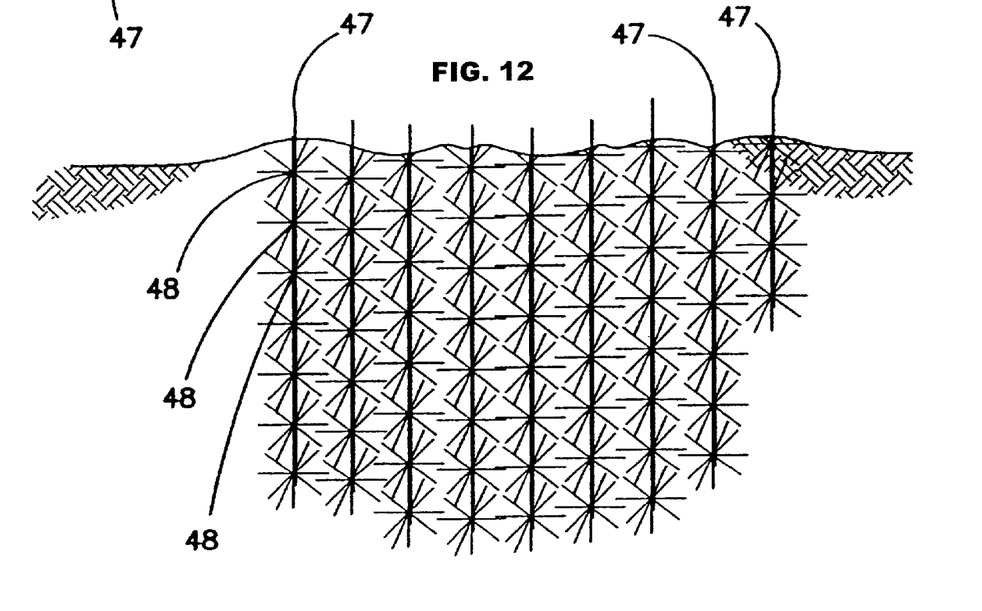
FIG. 12 shows an elevation view of a typical treatment pattern.

From the foregoing teachings it should be understood that the axial penetration lines 47 can also be directed on a slant to allow remediation under building 53, as shown in FIGS. 10 and 11. Also remediation may be achieved under slabs 54 by placing a small access hole 55 through the slab 54 and angling the axial penetration line 47 outward therefrom. Another typical treatment pattern is depicted in FIGS. 11 and 12.

Also from the teachings of this invention it should be understood that it may be used with other remediation systems such as the large bore hole remediation process to hit areas which need specialized attention or have special problems or need special chemicals for the remediation process. Also the system of this invention can be used in the specialized site areas which have had contaminated dirt hauled in for treatment because the system can be used to treat piles of contaminated soil just as well. It can also be used with the drilled-in collection line systems as an enhancement to the other process being applied.

As is apparent from the foregoing specification, the present invention is susceptible of being embodied with various alterations and modifications which may differ particularly from those that have been described in the preceding specification and descriptions. For this reason, it is to be fully understood that all of the foregoing is intended to be merely illustrative and is not to be construed or interpreted as being restrictive or otherwise limiting of the present invention, excepting as it is set forth and defined in the hereto-appended claims.

I claim:

1. A deep remediation injection system for in-situ remediation of contaminated soil and ground water capable of progressive penetration both vertically and horizontally in contaminated soil comprising a soil penetrating lance for injecting at least two different highly-pressurized fluids taken from the group of air, gaseous oxygen, ozone, oxygenated liquid, hydrogen peroxide, surfactant-containing liquid, or catalyst-containing liquid and suspended biologicals-containing liquids, into said contaminated soil as said soil penetrating lance is inserted for penetration therein, said soil penetrating lance having at least an upper set of injection ports, said upper set of injection ports being generally radially spaced-apart on said lance, and at least one lower set of injection ports, said lance having an average width in the vicinity of said upper set of injection ports, said lance including substantially fluidically-independent first and second conduits leading, respectively, to said lower set of injection ports and said upper set of injection ports so as to permit delivery of separate pressurized fluid streams to said upper and lower sets of injection ports and then into said soil, said upper and lower sets of injection ports being spaced apart from each other on said lance a distance no farther than about three times the average width of said lance in the vicinity of said upper set of injection ports.

2. A deep remediation system as defined in claim 1, wherein said upper and lower sets of injection ports are spaced apart from each other a distance no farther than about two times the average width of said lance in the vicinity of said upper set of injection ports.

3. A deep remediation system as defined in claim 1, wherein said lower set of injection ports of said lance includes at least three spaced-apart substantially radial ports.

4. A deep remediation system as defined in claim 1, wherein said lower set of injection ports of said lance includes at least four spaced-apart substantially radial ports.

5. A deep remediation system as defined in claim 3, wherein each of said radial ports is angled upwardly at approximately 15 degrees.

6. A deep remediation system as defined in claim 3, wherein each of said radial ports of said lower set of ports of said lance are recessed into a first circumferential groove.

7. A deep remediation system as defined in claim 3, wherein said lower set of injection ports of said lance further includes an axial port.

8. A deep remediation system as defined in claim 1, wherein said lance includes a circumferential groove disposed within said lower set of injection ports of said lance.

9. A deep remediation system as defined in claim 1, further including a first selector valve for selectively fluidically connecting said first conduit of said lance to a selected one of at least two fluid sources.

10. A deep remediation system as defined in claim 1, further including a second selector valve for selectively fluidically connecting said second conduit of said lance to a selected one of at least two fluid sources.

11. A deep remediation system as defined in claim 1, further including a first selector valve for selectively fluidically connecting said first conduit of said lance to a selected one of at least two fluid sources and a second selector valve for selectively fluidically connecting said second conduit of said lance to a selected one of at least two fluid sources.

12. A deep remediation system as defined in claim 1, wherein said lance includes a shaft portion and a fluid injection portion, said fluid injection portion including said upper and lower set of injection ports, said first conduit being co-axial inside said second conduit in at least said shaft portion of said lance.

13. A deep remediation system as defined in claim 12, wherein said shaft portion and said fluid injection portion of said lance are removably joinable together, said first conduit being fluidically connectable to said lower set of injection ports and fluidically sealable from said upper set of injection ports by means of a plurality of co-axial O-ring seals.

14. A deep remediation system as defined in claim 1, wherein said highly pressurized fluid is pressurized in the range of 3000 to 6000 psi.

15. A deep remediation system as defined in claim 14, wherein said highly pressurized fluid is pressurized in the range of 3200 to 6000 psi.

16. A deep remediation system as defined in claim 15 wherein said highly pressurized fluid is pressurized in the range of 4000 to 6000 psi.

17. A deep remediation injection system of claim 13 further comprising an adapter tube between said shaft portion and said fluid injection portion, said adapter tube having an upper end including a plurality of co-axial O-rings and being adapted for co-axial insertion into said first conduit in said shaft, and a lower end including a plurality of co-axial O-rings and being adapted for co-axial insertion into a conduit in said fluid injection portion, thereby permitting flow of fluid from said first conduit to said lower set of injection ports and sealably separating said fluid from fluid in said second conduit leading to said upper set of injection ports.

18. A method of in-situ deep remediation of contaminated soil and ground water using an injection lance capable of progressive penetration both vertically and horizontally in contaminated soil having an upper set of injection ports and a lower set of injection ports, comprising the steps of:

connecting a source of highly-pressurized gas to one of said upper and lower sets of injection ports, connecting a source of first highly-pressurized liquid selected from the group consisting of an oxygenating liquid taken from the group consisting of hydrogen peroxide, liquid containing dissolved ozone, liquid containing dissolved oxygen, liquid-containing suspended biologicals or liquid containing catalyst, or liquid containing a surfactant, to the other of said upper and lower sets of injection ports, penetrating said lance into said soil to inject said gas and liquid into it through said upper and lower sets of injection ports, disconnecting said source of gas and connecting in its place a source of a second highly-pressurized liquid selected from the group consisting of hydrogen peroxide, liquid containing dissolved ozone, liquid containing dissolved oxygen, liquid containing suspended biologicals, liquid containing a catalyst, liquid containing a surfactant or other chemical, said second highly-pressurized liquid being different from said first highly-pressurized liquid.

* * * * *